United States Patent
Quintero et al.

(10) Patent No.: US 8,091,645 B2
(45) Date of Patent: *Jan. 10, 2012

(54) IN SITU FLUID FORMATION FOR CLEANING OIL- OR SYNTHETIC OIL-BASED MUD

(75) Inventors: Lirio Quintero, Houston, TX (US); David E. Clark, Humble, TX (US); Thomas A. Jones, Cypress, TX (US); Jean-Louis Salager, Merida (VE); Ana Forgiarini, Merida (VE)

(73) Assignee: Baker Hughes Incorporated, Houston, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 11/866,486

(22) Filed: Oct. 3, 2007

(65) Prior Publication Data

US 2008/0110618 A1 May 15, 2008

Related U.S. Application Data

(60) Provisional application No. 60/850,739, filed on Oct. 11, 2006.

(51) Int. Cl.
*E21B 37/08* (2006.01)
(52) U.S. Cl. ........................................ 166/312; 166/278
(58) Field of Classification Search ........................ None
See application file for complete search history.

(56) References Cited

U.S. PATENT DOCUMENTS

| | | |
|---|---|---|
| 3,504,744 A | 4/1970 | Davis, Jr. et al. |
| 3,983,940 A | 10/1976 | Carpenter, Jr. et al. |
| 4,017,405 A | 4/1977 | Holm |
| 4,125,156 A | 11/1978 | Glinsmann |
| 5,830,831 A * | 11/1998 | Chan et al. ............. 507/211 |
| 6,581,687 B2 | 6/2003 | Collins et al. |
| 6,613,720 B1 | 9/2003 | Feraud et al. |
| 6,672,388 B2 | 1/2004 | McGregor et al. |
| 7,134,496 B2 * | 11/2006 | Jones et al. ............. 166/278 |
| 7,222,672 B2 * | 5/2007 | Blauch et al. ............ 166/278 |

(Continued)

FOREIGN PATENT DOCUMENTS

WO WO0100747 A 1/2001

(Continued)

OTHER PUBLICATIONS

Schlumberger OIlfield Glossary, "brine," retrieved Jan. 28, 2009 from http://www.glossary.oilfield.slb.com/Display.cfm?Term=brine.*

(Continued)

*Primary Examiner* — Angela M DiTrani
(74) *Attorney, Agent, or Firm* — Mossman Kumar & Tyler PC

(57) ABSTRACT

Nanoemulsion, macroemulsions, miniemulsions, microemulsion systems with excess oil or water or both (Winsor I, II or III phase behavior) or single phase microemulsions (Winsor IV) improve the removal of filter cakes formed during hydrocarbon reservoir wellbore drilling with OBM. The macroemulsion, nanoemulsion, miniemulsion, microemulsion systems with excess oil or water or both or single phase microemulsion removes oil and solids from the deposited filter cake. In one non-limiting embodiment, the emulsion system (e.g. single phase microemulsion, nanoemulsion, or other emulsions) may be formed in situ (downhole) rather than produced or prepared in advance and pumped downhole. Skin damage removal from internal and external filter cake deposition can be reduced.

20 Claims, 5 Drawing Sheets

U.S. PATENT DOCUMENTS

| | | | |
|---|---|---|---|
| 2003/0166472 | A1 | 9/2003 | Pursley et al. |
| 2004/0063795 | A1* | 4/2004 | VonKrosigk et al. ............ 516/38 |
| 2006/0073986 | A1* | 4/2006 | Jones et al. .................... 507/129 |
| 2006/0096757 | A1 | 5/2006 | Berry et al. |
| 2006/0211593 | A1 | 9/2006 | Smith et al. |
| 2006/0258541 | A1 | 11/2006 | Crews |
| 2007/0295368 | A1* | 12/2007 | Harrison et al. ................ 134/42 |

FOREIGN PATENT DOCUMENTS

| | | | |
|---|---|---|---|
| WO | WO 2006/051255 | * | 5/2006 |
| WO | 2006109016 A1 | | 10/2006 |

OTHER PUBLICATIONS

M. Miñana-Perez, et al., "Solubilization of Polar Oils with Extended Surfactants," Colloids and Surfaces A: Physicochemical and Engineering Aspects, 1995, pp. 217-224, vol. 100.

M. Miñana-Perez, et al., "Solbilization of Polar Oils in Microemulsion Systems," Progr. Colloid Polym. Sci., 1995, pp. 177-179, vol. 98.

J. Salager, et al., "Chapter 8: Ionic Microemulsions," P.Kumar, et al. Handbook of Microemulsion Science and Technology, 1999, pp. 247-280, Marcel Dekker, New York.

G. Penny, et al., "The Application of Microemulsion Additives in Drilling and Stimulation Results in Enhanced Gas Production," SPE 94274, 2005 SPE Production and Operations Symposium, Apr. 17-19, 2005, pp. 1-9, Oklahoma City, Oklahoma.

L. Quintero, et al., "One-Step Acid Removal of an Invert Emulsion," SPE 94604, SPE 6th European Formation Damage Conference, May 25-27, 2005, pp. 1-9, Scheveningen, The Netherlands.

J. L. Salager, et al., "Enhancing Solubilization in Microemulsions—State of the Art and Current Trends," Journal of Surfactants and Detergents, Jan. 2005, pp. 3-21, vol. 8, No. 1.

J. L. Salager, et al., "Amphiphilic Mixtures versus Surfactant Structures with Smooth Polarity Transition across Interface to Improve Solubilization Performance", CESIO 2008—7th World Surfactant Congress Paris, Jun. 22-25, 2008, pp. 1-9.

J. Harrison; "Microemulsion Technology for Surfactants," Specialty Chemicals Magazine, Nov. 2004, pp. 32, 34, 36.

* cited by examiner

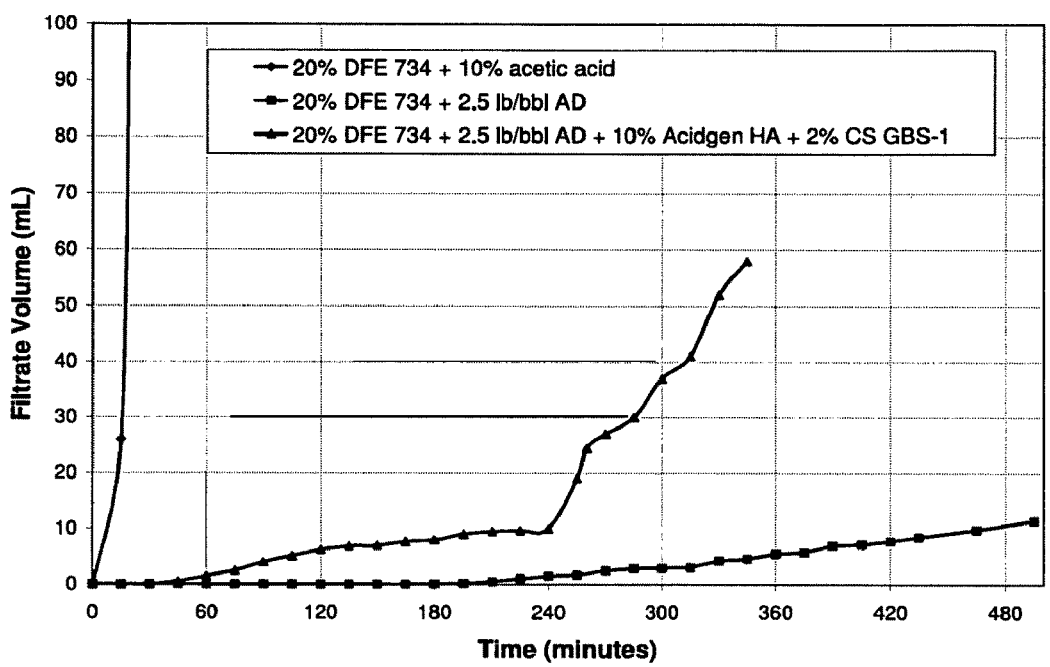
FIG. 4: Filtration Test Results
20% DFE 734 in 10 lb/gal (1.2 kg/liter) in $CaCl_2$ brine / *in situ* Single Phase Microemulsion
Three-hour mud-off on 20 μm ceramic disc and leak-off valve open

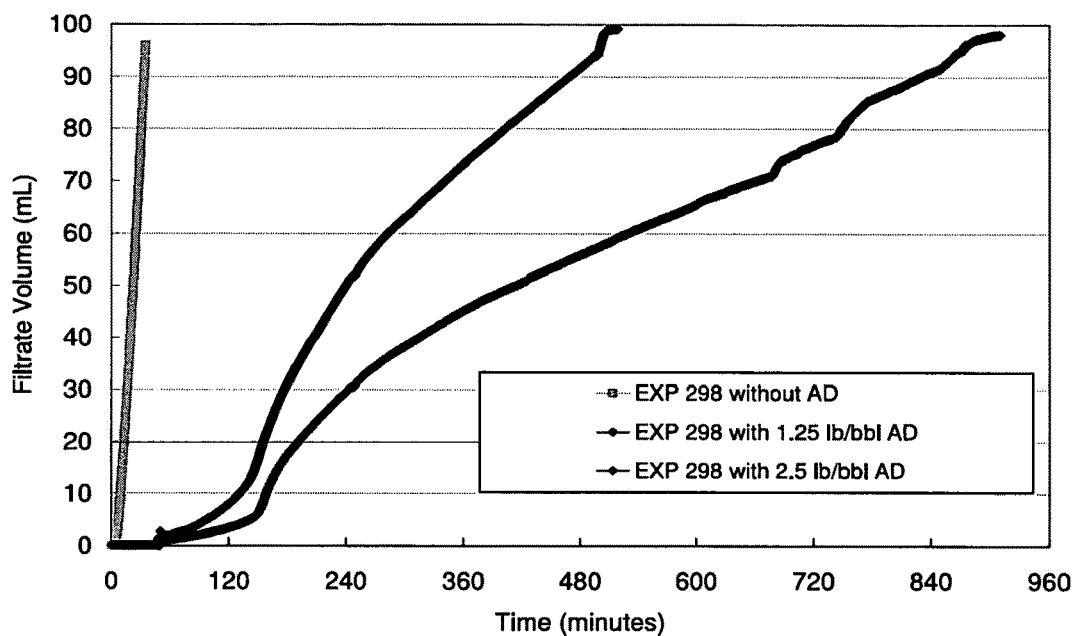
FIG. 5: Filtration Test Results
20% EXP 298 in 10 lb/gal (1.2 kg/liter) in NaBr brine / *in situ* Single Phase Microemulsion
Three-hour mud-off on 20 μm ceramic disc and leak-off valve open

FIG. 6: Filtration Test Results
20% EXP 298 in 10 lb/gal (1.2 kg/liter) in HCOOK brine / in-situ Single Phase Microemulsion
Three-hour mud-off on 20 μm ceramic disc and leak-off valve open
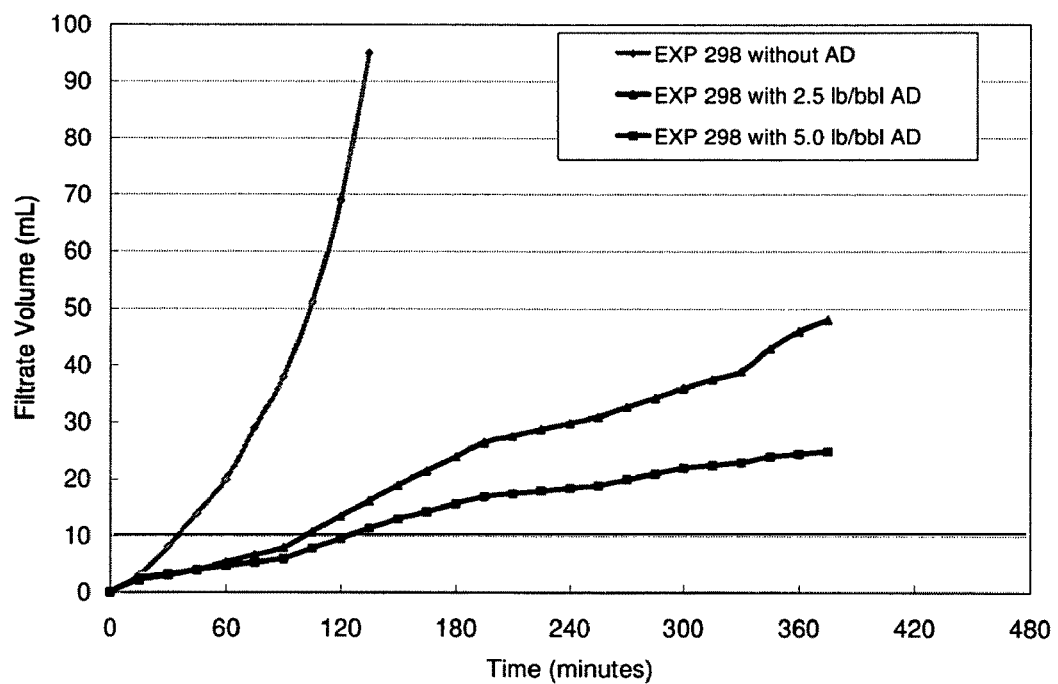

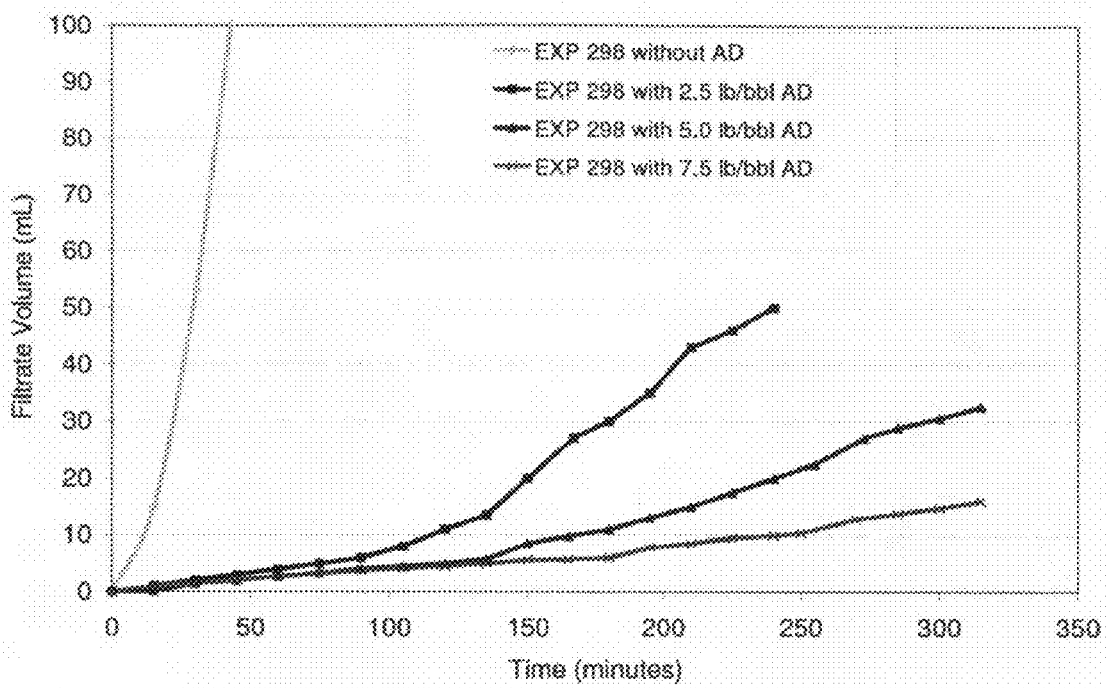
FIG. 7: Filtration Test Results
20% EXP 298 in 10 lb/gal (1.2 kg/liter) in $CaCl_2$ brine / in-situ Single Phase Microemulsion
Three-hour mud-off on 20 μm ceramic disc and leak-off valve open
FIG. 8

IN SITU FLUID FORMATION FOR CLEANING OIL- OR SYNTHETIC OIL-BASED MUD

CROSS-REFERENCE TO RELATED APPLICATIONS

This application claims the benefit of U.S. Provisional Application No. 60/850,739 filed Oct. 11, 2006, and is a continuation-in-part of U.S. patent application Ser. No. 11/541,860 filed Oct. 2, 2006, which is a divisional application from U.S. patent application Ser. No. 11/218,822 filed Sep. 2, 2005, now issued Nov. 14, 2006 as U.S. Pat. No. 7,134,496, which in turn claimed the benefit of U.S. Provisional Application No. 60/606,959 filed Sep. 3, 2004.

TECHNICAL FIELD

The present invention relates to methods and compositions for reducing or removing wellbore skin damage, oil-based drilling fluids and filter cake deposition during and after oil well drilling, and more particularly relates, in one non-limiting embodiment, to methods and compositions for reducing or removing oil-based drilling fluids and bridging particles using macroemulsion, nanoemulsion, miniemulsions, microemulsions systems in equilibrium with excess oil or water (Winsor I and Winsor II phase behavior), or both (Winsor III) or single phase microemulsions (Winsor IV) formed in situ, particularly as a consequence of the mixing of in place fluids and solids with injected formulas.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid should carry cuttings from beneath the bit, transport them through the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud the oil may consist of any oil that may include, but is not limited to, diesel, mineral oil, esters, or alpha-olefins.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

Filter cakes are the residue deposited on a permeable medium such as a formation surface when a slurry, suspoemulsion or suspension, such as a drilling fluid, is forced against the medium under pressure. Filtrate is the liquid that passes through the medium, leaving the cake on the medium. Cake properties such as cake thickness, toughness, slickness and permeability are important because the cake that forms on permeable zones in a wellbore can cause stuck pipe and other drilling problems. Reduced hydrocarbon production can result from reservoir or skin damage when a poor filter cake allows deep filtrate invasion. In some cases, a certain degree of cake buildup is desirable to isolate formations from drilling fluids. In open hole completions in high-angle or horizontal holes, the formation of an external filter cake is preferable to a cake that forms partly inside the formation (internal). The latter has a higher potential for formation damage. It will be appreciated that in the context of this invention the term "filter cake" includes any oil, emulsion or invert emulsion part of the filter cake, and that the filter cake is defined herein as a combination of any added solids, if any, and drilled solids with the drilling fluid. It will also be understood that the drilling fluid, e.g. OBM is concentrated at the borehole face and partially inside the formation. Further, an open hole completion is understood to be a well completion that has no liner or casing set across the reservoir formation, thus allowing the produced fluids to flow directly into the wellbore. A liner or casing may be present in other intervals, for instance between the producing interval and the surface.

Many operators are interested in improving formation clean up after drilling into reservoirs with OBMs. More efficient filter cake and formation clean up is desired for a number of open hole completions, including stand-alone and expandable sand screens as well as for gravel pack applications for both production and water injection wells. Skin damage removal from internal and external filter cake deposition during oil well reservoir drilling with oil-based drill-in and drilling fluids is desirable to maximize hydrocarbon recovery, particularly in open hole completions.

It would be desirable if compositions and methods could be devised to aid and improve the ability to clean up filter cake, and to remove it more completely, without causing additional formation damage. It is also desirable to control the rate of destruction and removal of the filter cake.

SUMMARY

There is provided, in one non-limiting form, a method of cleaning OBM filter cake particles from a hydrocarbon reservoir wellbore. The method involves drilling a wellbore in a hydrocarbon reservoir with an OBM. A filter cake of OBM particles is formed over at least part of the wellbore. The oil-based fluids and filter cake are contacted with at least one surfactant and a polar liquid to form macroemulsions, nanoemulsions, miniemulsions, and/or microemulsions in equilibrium with excess oil or water (Winsor I or II phase behavior) or both (Winsor III) and/or single phase microemulsions (Winsor IV) in situ. That is, these emulsions are formed in situ at the site of the OBM filter cake or particles. Any of these in-situ fluids, thus incorporates at least a portion of the oil present or oil of the filter cake into the macroemulsions, nanoemulsions, miniemulsions, microemulsions in two or three-phase systems and/or single phase microemulsion (SPME) for the removal of the oil therefrom.

An acid may be optionally used to solubilize the bridging particles in the filter cake. The acid may be a mineral acid and/or an organic acid, and in one non-limiting embodiment may be a polyamino carboxylic acid (PACA). In another non-restrictive version, the acid may also be generated in situ. Solid particles may be solubilized by chelating agents or sequestering agents that form a complex with the divalent ions and reduces or avoid the precipitation of the divalent ion salts, such as calcium carbonate or barium sulfate.

Additionally, there is provided in another non-limiting embodiment of the invention, a modified method of cleaning OBM and filter cake particles from a hydrocarbon reservoir wellbore. The method concerns drilling a wellbore in a hydrocarbon reservoir with an OBM. A filter cake of OBM particles is formed over at least part of the wellbore. A gravel pack carrier brine is pumped into the wellbore, where the carrier brine includes sized gravel, at least one surfactant, and a polar liquid. A gravel pack is placed into the wellbore. The OBM and filter cake are contacted with the gravel pack carrier brine to form nanoemulsions, miniemulsions, microemulsions and/or single phase microemulsions in situ and thereby incorporating at least a portion of the oil from the OBM into the fluids by solubilization. This may be done without circulating the well. The wettability of the filter cake particles is changed from oil-wet to water-wet allowing the single phase microemulsion to contact the filter cake for a period of time as a soak solution. The majority of the filter cake particles may thus be removed.

There is additionally provided in an alternate embodiment a thermodynamically stable, macroscopically homogeneous, single phase microemulsion that includes a polar phase; a nonpolar phase; a surfactant; and optionally a co-surfactant and acid. Since the emulsion is formed in situ, the polar phase may be from the OBM present in the wellbore and/or filter cake.

BRIEF DESCRIPTION OF THE DRAWINGS

FIG. 4 is a graph of filtration test results for 20% DFE 734 in 10 lb/gal (1.2 kg/liter) $CaCl_2$ brine with an in situ single phase microemulsion using a 3-hour mud-off on a 20 μm ceramic disk with the leakoff valve open, with and without an additive for delayed action (AD);

FIG. 5 is a graph of filtration test results for 20% EXP 298 in 10 lb/gal (1.2 kg/liter) NaBr brine with an in situ single phase microemulsion using a 3-hour mud-off on a 20 μm ceramic disk with the leakoff valve open, with and without an additive for delayed action (AD);

FIG. 6 is a graph of filtration test results for 20% EXP 298 in 10 lb/gal (1.2 kg/liter) HCOOK brine with an in situ single phase microemulsion using a 3-hour mud-off on a 20 μm ceramic disk with the leakoff valve open, with and without an additive for delayed action (AD);

FIG. 7 is a graph of filtration test results for 20% EXP 298 in 10 lb/gal (1.2 kg/liter) $CaCl_2$ brine with an in situ single phase microemulsion using a 3-hour mud-off on a 20 μm ceramic disk with the leakoff valve open, with and without an additive for delayed action (AD); and FIG. 8 is a photograph of a filter cake after treatment with DFE 734 in 10 lb/gal (1.2 kg/liter) $CaCl_2$ brine.

DETAILED DESCRIPTION

Figure 1:
FIG. 1 is a photograph of typical OBM filter cake appearance after mud-off at 140° F. (60° C.) and 500 psi (3.4 MPa)

It has been discovered that post drill-in treatment and alteration of a majority of filter cake particles may be accomplished by changing the OBM into a macroemulsion, a nanoemulsion, a miniemulsion, a microemulsion (Winsor III) and/or single phase microemulsion, such as Winsor IV or similar chemistry, as will be described in more detail. Single phase microemulsions may be defined as bi-continuous, O/W or W/O. In one non-limiting explanation of the inventive phenomenon, an O/W single phase microemulsion contacts the oil-based mud and filter cake and forms a water continuous (oil-in-water) microemulsion. It has been surprisingly discovered that this contacting may be accomplished without circulating the well, by which is meant pumping fluid through the whole active fluid system, including the borehole and all the surface tanks that constitute a primary system. It has also been discovered that the microemulsion may be formed in situ downhole. That is, it is not necessary to form the microemulsion on the surface and pump it downhole. It is believed that this in situ microemulsion process slows the solubilization of oil from the filter cake and enhances cleaning operation. The literature generally describes these microemulsions as single phase microemulsions, but they also may be also as a microemulsion in equilibrium with excess water and/or oil phases, i.e. as a part of a three-phase system.

More specifically, the methods and compositions herein involve using an in-situ reaction fluid such as a microemulsion for removing oil-based mud (OBM) filter cake or synthetic oil-based mud (SBM) filter cake, and reversing the wettability and removing or minimizing wellbore skin damage in oil wells drilled with SBMs or OBMs. The in-situ fluid (e.g. microemulsion, nanoemulsion, etc.) may be formed when at least one surfactant and a polar phase (usually, but not limited to water) contacts the OBM or OBM filter cake and solubilizes the non-polar material of the OBM. It should be understood herein that the term OBM encompasses SBMs.

One of the benefits of the in situ fluid formation is that the cleaning fluid does not require any oil or solvent in the formulation, which gives a higher capacity for oil incorporation or cleaning capability when contacted with the OBM filter cake. Another benefit is that solid particles of the filter cake might turn from oil-wet to water-wet. Additionally, a water-based filter cake is ideal for damage remediation (filter cake destruction) when mineral acids, organic acids, oxidizing agents, water-soluble enzymes (e.g. catalysts), chelating agents and in situ acid generators are spotted into a wellbore after or during the filter cake wettability reversal process. As the OBM (or SBM) filter cake is converted from oil-wet to water-wet during the in situ formation of a fluid, such as a microemulsion or nanoemulsion, the blend of surfactants and a polar phase (e.g. water) may also contain acids, dissolvers (chelating agents) of divalent salts (calcium carbonate, magnesium or barium sulfate etc) or other precursor additives that can dissolve the carbonate or barite particles and break down the polymeric fluid loss additive (if present). In many cases, the surfactant may be a surfactant blend and often a surfactant-cosurfactant mixture, in which the co-surfactant is a short amphiphilic substance such as an alcohol (in non-limiting examples, propanol, butanol, pentanol in their different isomerization structures) as well as glycols, and ethoxyated and propoxylated alcohols or phenols.

The use of this in-situ fluid (e.g. single phase microemulsion, nanoemulsion, miniemulsion, etc.) chemistry in open hole completion optionally allows the direct contact of a chelating agent, including, but not necessarily limited to, an acid and/or acid blend mixed in conventional brine completion fluids (or generated in situ), without causing a high viscosity oil continuous emulsion (sludge) and formation blockage. The action of the in situ formed fluid alters the deposited filter cake which allows a chelating agent such as an acid or a salt of an acid, such as a polyamino carboxylic acid (PACA) and/or a mineral acid or salt thereof, e.g. hydrochloric acid or an organic acid or salt thereof, e.g. acetic acid, or other acid, to solubilize the bridging and formation particles, such as calcium carbonate, hematite, ilmenite, and barite. Bridging particles composed of manganese tetroxide (in one non-limiting embodiment) may be treated with an in-situ fluid (e.g. a single phase microemulsion)/acid blend, providing the acid is an organic acid in one non-limiting embodiment of the invention. It has been found that PACAs perform relatively better in an alkaline environment as the salt of these acids, which further differentiates them from the more common acidic acids and salts thereof.

For instance a salt of PACA dissociates barium sulfate from the calcium carbonate treated; the PACA takes on the cation. In a non-limiting example, a Na or K salt of PACA when contacting calcium carbonate contacts and dissolves the barium salt through cationic exchange. The salt forms of PACAs perform relatively better than the plain acid form, but the non-salt acid form still performs the functions and achieves the desired results of the methods and compositions herein. The plain acid form works somewhat better at relatively low pH.

The net effect of such a treatment system will improve an operator's chance of injecting water in a reservoir to maintain reservoir pressure (for example, for injection wells), and improve production rates in producing wells. In either case, skin (filter cake) alteration is accomplished by creating the in-situ fluid (e.g. single phase microemulsion) across the injection/production interval. The in-situ fluid (e.g. single phase microemulsion) may be used for open hole expandable and non-expandable screen applications or various cased hole operations.

In brief, one non-limiting embodiment OBM filter cake clean up technology herein, also referred to as "one-step" filter cake clean up, utilizes in situ single phase microemulsion, e.g., and optional chelating agent techniques in a single blend to change the oil or invert emulsion of an OBM filter cake to a microemulsion (or in other in-situ fluid) and simultaneously decompose its acid soluble components. Altering the filter cake using an in situ single phase microemulsion (or in other in-situ fluid) facilitates the elimination of solids as solubilized in the aqueous solution component of the in-situ fluid thus preventing the occurrence of a sludge that could form between the chelating agent and OBM cake.

It will be appreciated that it is not necessary for all of the bridging particles to be removed from a filter cake for the inventive method and its compositions to be considered successful. Success is obtained if more particles are removed using the in-situ fluid (e.g. single phase microemulsion) than if it is not used, or if more particles are removed using the in-situ fluid together with a chelating agent, as compared to the case where no in-situ fluid and/or chelating agent is used. Alternatively, the invention is considered successful if at least a portion of the filter cake particles are removed. In one non-limiting embodiment at least a majority (>50%) of the filter cake particles are removed. In general, of course, it is desirable to remove as much of the OBM and filter cake as possible. One non-restrictive goal of the invention to remove filter cake particles is to obtain a high percentage of water injection (in a non-limiting instance, >50% injection) or higher percentage of oil and gas production as compared to the expected production in the case where no microemulsion is used whatsoever.

Of particular interest is the ability to drill into a reservoir having massive shale sections with an OBM, e.g. invert emulsion drill-in fluid and gravel packing the same wellbore using brine as the carrier fluid for the gravel pack sand. For this technique to be effective, shale stability must be maintained and there must not be unwanted sludge created between the brine carrier fluid and OBM (e.g. invert emulsion) filter cake during or after the gravel pack.

The wellbore clean up technology described herein has a wide range of applications. By combining the chemical aspect of wellbore (filter cake) clean up with displacement techniques, it is believed that gravel packing disadvantages after drill-in with OBMs (e.g. invert emulsion fluids) and gravel packing with brine carrier fluids can be significantly reduced or eliminated.

The methods and compositions herein have the advantages of reduced formation skin damage to the well, and consequently increased hydrocarbon recovery, and/or increased water injection rate, as compared with an otherwise identical method and composition absent the in-situ fluid (e.g. single phase microemulsions and/or the single phase microemulsion including an acid). Microemulsions are thermodynamically stable, macroscopically homogeneous mixtures of at least three components: a polar phase and a nonpolar phase (usually, but not limited to, water and organic phase) and a surfactant, often more than one surfactant, for instance with a cosurfactant such as an alcohol, glycol or phenol, or their ethoxy derivatives, particularly when ionic surfactants are used, as mentioned in the reference: J. L. Salager and R. E. Anton, "Ionic Microemulsions", Chapter 8, in P. Kumar and K. L. Mittal, ed. *Handbook of Microemulsion Science and Technology*, Marcel Dekker Inc. New York 1999, pp. 247-280. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New York, 1999, pp. 185-246.

The referenced chapters describe the types of microemulsion phase formulations defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions of the present invention are of the Winsor IV type, which means the entire system is a microemulsion phase. The thermodynamically stable single phase Winsor IV microemulsion could evolve by a change in formulation or composition into the formation of a miniemulsion or nanoemulsion, which is a two-phase system with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjoblöm Ed., $2^{nd}$ Edition, Chap. 4, pp. 185-226, Taylor and Francis, London (2006).

Surfactants suitable for creating the in-situ fluids (e.g. single phase microemulsions) of this invention include, but are not necessarily limited to nonionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable cationic surfactants include, but are not necessarily limited to, arginine methyl esters, alkanolamines and alkylenediamides. In one non-limiting embodiment at least two surfactants in a blend may be used to create single phase microemulsions in situ, as well as the other in-situ fluids. Suitable surfactants may also include surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments. In one non-limiting embodiment, the cosolvent or co-surfactant has an absence of a propionate.

In another non-restrictive embodiment of the invention, the in-situ fluid formulation (e.g. macroemulsion, nanoemulsion, etc.) may contain a co-surfactant which may be an alcohol having from about 3 to about 10 carbon atoms, in another non-limiting embodiment from about 4, independently up to about 6 carbon atoms. A specific example of a suitable co-surfactant includes, but is not necessarily limited to n-butanol and propanol, or sec-butanol.

In one non-limiting embodiment of the invention, the in-situ fluid (e.g. single phase microemulsion) contains a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as Escaid 110 (from Exxon) or ECD 99-DW oils (from TOTAL) can also be used as a non-polar liquid in preparing the fluid systems of this invention. As noted previously, an advantage of forming the fluids (e.g. nanoemulsion, single phase microemulsion, etc.) in situ is that less non-polar liquid needs to be used (as compared with a pre-formed microemulsion) since the non-polar liquid is found in the OBM (or SBM) filter cake itself. This gives a higher capacity for the microemulsion, e.g., to absorb the oil in the filter cake.

It will be appreciated that the amount of in-situ fluid to be created or formed and the amounts of in-situ-forming components (polar, nonpolar and a surfactant and co-surfactant mixture) to be added or included are difficult to determine and predict in advance with much accuracy since it is dependent upon a number of interrelated factors including, but not necessarily limited to, the brine type, the bridging particle type, the temperature of the formation, the particular surfactant or surfactant blend used, whether a chelating agent is present and what type, etc. Nevertheless, in order to give some idea of the quantities used, in one non-limiting embodiment, the proportion of non-brine components in the in-situ fluid (e.g. single phase microemulsion) may range from about 1 to about 50 volume %, from about 5, independently up to about 20 volume %.

It is expected that brine will be a common component of the in-situ fluid (e.g. single phase microemulsion), and any of the commonly used inorganic and organic brines, and salts to make them, are expected to be suitable in the compositions and methods of this invention. Although water is expected to be the polar liquid used to make the microemulsions in situ, it will be appreciated that other polar liquids such as alcohols and glycols, alone or together with water, may be used.

In the non-limiting embodiment where the in-situ fluid (e.g. single phase microemulsion) contains at least one chelating agent, the chelating agent should be capable of solubilizing or dissolving the bridging particles that make up the filter cake. The chelating agent may be an inorganic acid or salt thereof including, but not necessarily limited to, hydrochloric acid, sulfuric acid, and/or an organic acids including, but not necessarily limited to, an organic agent or salt thereof, e.g. acetic acid, formic acid and mixtures thereof. In one non-limiting embodiment, the acid may be only one mineral acid or only one organic acid.

In most embodiments, the in-situ fluid may contain at some point a chelating agent that is a polyamino carboxylic acid (PACA) or a salt of PACA. Suitable PACAs and other chelating agents include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetramine hexaacetic acid (TTHA), trans-1,2-diaminocyclohexane tetraacetic acid (DCTA), polyphosphates, pyrophosphates, alpha-ether carboxylates, oxy-diacetate salts, carboxymethyl tartronate (CMT) and oxy-succinate (CMOS), citric, tartaric and tartronic salts and mixtures thereof.

The concentration of chelating agent in the in-situ fluid (e.g. single phase microemulsion) has a lower limit of about 1 volume %, alternatively of about 5 volume %, and an upper limit of about 30 volume %, alternatively about 20 volume %, and in another non-restrictive embodiment up to about 15 volume %.

There are various ways by which the chelating agent may be delivered according to the inventive procedure. The chelating agent may be added to the filter cake with the components to form the single phase microemulsion, e.g., in situ; or may be added after the in-situ fluid (e.g. single phase microemulsion) treatment; or may be added to the microemulsion soak solution once it is formed in place before removing the majority of the filter cake particles and OBM (e.g. invert emulsion) and combinations thereof.

Typical or expected bridging particles expected to be useful in the methods of this invention include, but are not necessarily limited to, calcium carbonate, hematite, ilmenite, manganese tetroxide, manganous oxide, iron carbonate, magnesium oxide, barium sulfate, and mixtures thereof.

In the embodiment where a gravel pack is introduced, the in-situ fluid (e.g. single phase microemulsion) may be created in situ in carrier brine containing sized gravel (sand) where the gravel is sized to bridge the formation to inhibit or prevent the production of sand. The gravel pack embodiment will be discussed in further detail below.

With further specificity, the methods and compositions herein may concern one-trip clean up spotting fluids designed to physically change an OBM (e.g. an invert emulsion) filter cake and acidify the acid soluble components on the cake. The inventive method not only physically changes the nature of the deposited filter cake, the resulting oil components of the original filter cake which are incorporated into the single phase microemulsion (e.g.) formation in situ and then further micro-emulsified or absorbed, allow for ease of water injection, in the case of injection wells, or ease of production through completion screens, in the case of production wells. With the conversion of the external oil to internal emulsified oil in water, plus the optional decomposition of minerals (e.g. bridging particles e.g. calcium carbonate and other acid-soluble components) by chelating agents, most of the filter cake is either removed or micro-sized to the extent that only a minimal or reduced amount of damaging components remain on a reservoir face.

In one non-limiting embodiment and in still further detail, the compositions and methods herein utilizes a microemulsion or other in-situ fluid to convert an OBM cake to a water-based filter cake. The benefits of such conversions are several. When an OBM filter cake is oil wet and poses compatibility problems for certain completion operations, such as water injection and gravel packing, a water-based filter cake is naturally compatible with injection water and brine-based gravel pack carrier fluids. Additionally, a water-based filter cake is ideal for damage remediation (filter cake destruction) when mineral acids, organic acids, oxidizing agents, water soluble enzymes (catalysts) and in situ acid generators are spotted in a wellbore after (or during) the filter cake reversal process.

The in-situ fluid (e.g. microemulsion forming) soak solution may also contain acids, barite dissolvers (chelants) or other precursor additives that can dissolve the acid-soluble particles or dissolve the barite and break down the fluid loss additive (polymeric or otherwise). The value of such a conversion using a single soak solution with all its functional components is that the OBM (e.g. invert emulsion) filter cake may be converted to a water-based filter cake containing dissolvable particulates and fluid loss control additives that may be removed in a single operational step. In addition, if immediate destruction is not required, a one-step soak solution may be formulated such that the water-based filter cake maintains its integrity until destruction is required.

In another non-limiting embodiment the microemulsion may optionally contain sized salts to replace the calcium carbonate in the OBM. These sized salts may then be dissolved with undersaturated water when desired. The sizes of the sized salt are specified in microns. Usually the blended size is specified as a D50 (average or 50%) diameter in microns of the blend as measured on a particle size analyzer. The blended sizes are also given D90 and D10 designations. D90 refers to 90% of particles being smaller than a measured micron size. Likewise, a D10 refers to 10% of the blended salt particles are less than a certain measured micron size. By sized salt in the context of the filtration control additive, the sized salt may include, but is not necessarily limited to NaCl, KCl, NaBr, KBr, HCOOK, HCOONa, $CaCl_2$, $CaBr_2$, $ZnBr_2$ and combinations thereof.

In another non-limiting embodiment, the salts suitable for use in creating the brine include, but are not necessarily limited to, inorganic salts as sodium chloride, potassium chloride, calcium chloride, sodium bromide, calcium bromide, and organic salts such as sodium formate, potassium formate, cesium formate, zinc bromide, sodium acetate, calcium acetate and combinations thereof. The density of the brines may range from about 8.4 lb/gal to about 15 lb/gal (about 1 to about 1.8 kg/liter), although other densities may be given elsewhere herein.

The method of operation for an open hole completion deploying either expandable or non-expandable screens and changing the filter cake, including removing oil and decomposing the mineral fraction may be as follows, in one non-limiting embodiment:

1. Drill to total depth with an OBM, which fluid includes acid-soluble weighting agents and/or bridging agents, where the weighting agents and/or bridging agents form a filter cake on the wellbore.
2. At total depth, a short trip is made into the casing.
3. Run the work string back in the hole (RIH) to the bottom and make any composition changes deemed necessary, such as chemical changes to optimize displacement, to the drilling fluid.
4. Pump a base oil spacer to scour any external filter cake in the wellbore.
5. Pump a viscosified, weighted push pill that includes the OBM to carry dislodged particles up the wellbore away from the production zone.
6. Pump a solids-free OBM into the open hole and at least partially into the casing, e.g. 100 to 200 feet (about 30 to about 61 meters) into the casing.
7. Once the leading edge of the solids-free OBM is positioned above the casing shoe, the bottom of the work string is pulled up into the casing shoe, and the original drilling fluid remaining in the casing and is circulated across appropriately sized shaker screens so that the larger solids are from the drilling fluid, leaving particles in the drilling fluid to a size that will not plug completion screens when running to bottom.
8. The work string is pulled out of the casing and the hole to the surface.
9. The completion screen may then be picked up and run to the bottom of the open hole. The completion screen, a sand control device, may be of any type but typically is either an expandable, stand-alone or gravel pack screen.
10. Expand screen, if the screen is expandable.
11. Trip out of the hole with the work string or expandable tools.
12. Run in the hole with modified CSAP (packer, ball valve and wash pipe) and set packer.
13. Displace the solids-free OBM emulsion in the open hole and spot the single phase microemulsion treatment, or in the case of forming the microemulsion in situ, the surfactant blend and the polar liquid or polar phase, in the open hole and 100-200 ft (30-61 m) into the casing, where the oil-in-water emulsion soak solution is as described previously.
14. Displace above packer assembly to single phase microemulsion treatment.
15. Check leak-off.
16. Allow the single phase microemulsion to penetrate the filter cake.
17. Prepare to inject water or produce hydrocarbons.

The in-situ fluid (e.g. single phase microemulsion or other emulsion) treatment may be composed of different brine and oil blends, depending on the required density of the fluid for the well. The optional acid, or PACA, or other chelating agent concentration may be varied as needed, including the type of additive or acid or chelating agent. One important new feature of the methods and compositions herein is that the in-situ fluid (e.g. microemulsion) optionally contains a chelating agent (acid or salt thereof) or PACA or other chelating agent that dissolves solids contained in the invert emulsion filter cake, and clean up a wellbore.

This technology does not require or discriminate against any OBM. In other words, the single phase microemulsion can be applied to filter cake clean up for any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In the inventive technology, the chelating agent is only used for removal of acid soluble bridging components. In one non-limiting embodiment the methods and compositions are practiced in the absence of amine emulsifiers, such as rosin amines and/or amine emulsifiers of the formula $R—N—[(CH_2CH_2R'A)_xH]_2$, such as those defined in U.S. Pat. Appln. Pub. No. 2004/0147404.

Another important feature relative to other OBM or invert emulsion filter cake removal methods is that the oil phase of the OBM emulsion is micro-emulsified into the single phase microemulsion (or in other in-situ fluid, such as nanoemulsion, miniemulsion or single phase emulsion). The inventive treatment process reduces the energy necessary for the microemulsion to form when compared to previous methods. This efficiency reduces the number of pipe trips and decreases the time required to complete the well. Further, the methods and compositions herein permit the filter cake to be maintained and then destroyed and removed over a controlled time period.

The invention will now be further discussed with respect to actual implementation of the invention in Examples which are not intended to limit the invention, but simply to further illustrate it. Again, while the in-situ fluid may be referred to as a "microemulsion" or "single phase microemulsion", it should be appreciated that the methods and compositions are expected to apply to other in situ fluids including, but not limited to miniemulsions, nanoemulsions, and all types of microemulsions.

A number of laboratory tests have been performed using the inventive in situ microemulsion chemistry and Baker Oil Tools' acid treatment packages on filter cakes deposited by an invert emulsion consisting of a 10 lb/gal (1.2 kg/liter) oil-based mud (OBM). Tables I, II, and III show permeability data after tests performed on 3 and 20 μm ceramic discs and Berea sandstone in a Disc-Sand-pack Permeameter. As the data below illustrates, the chemical techniques of removing filter cake damage and avoiding sludge damage has been demonstrated by performing a series of water injection tests. Water injection testing was chosen because this type of test mimics a "worse case" scenario and more easily exposes incomplete clean up results.

Phase I: Testing the Concept with a "Two-Step" Soak Procedure (Soak Without Acid Followed by Conventional Acidification Process)

The first phase of testing consisted of filter cake deposition on 3, 10, 20 and 35 μm ceramic discs followed by treatment with a formulation, such as Exp-298 and DFE 734, a concentrate used to form the in situ single phase microemulsion. Both Exp-298 and DFE 734 are proprietary surfactants blend from Baker Hughes Drilling Fluids that contains a blend of surfactants with co-surfactants and water.

The first part of the test was the measurement of initial permeability. After establishing the initial seawater injection permeability, a mud-off was performed to deposit a filter cake for subsequent destruction by the soak solution. The cake deposition time for these tests was 3 hours. The purpose of a 3-hr mud-off, at 140° F. (60° C.), 150° F. (66° C.) or 194° F. (90° C.) and 500 psi (3.4 MPa) was to have a filter cake that had a reasonable thickness to "break", in order to verify the efficacy of the single phase microemulsion technology. Typical mud cake appearance after mud-off at 150° F. (60° C.) and 500 psi (3.4 MPa) is shown in the FIG. 1 photograph. After removing the mud from the cell and verifying that a good filter cake was deposited on the disc, the soak solution was carefully added and allowed to destroy the cake. Each soak solution contained 20% volume DFE 734 in $CaCl_2$ brine or in NaCl brine was allowed to soak at constant temperature (140° F. (60° C.), 150° F. (66° C.) or 194° F. (90° C.)) and 360 psi (2.5 MPa) overbalanced for 3.0 hours. The OBM mud was purposely formulated with at least 50 lb/bbl (143 g/liter) of calcium carbonate in anticipation of follow-up acid soak treatments.

Figure 2:
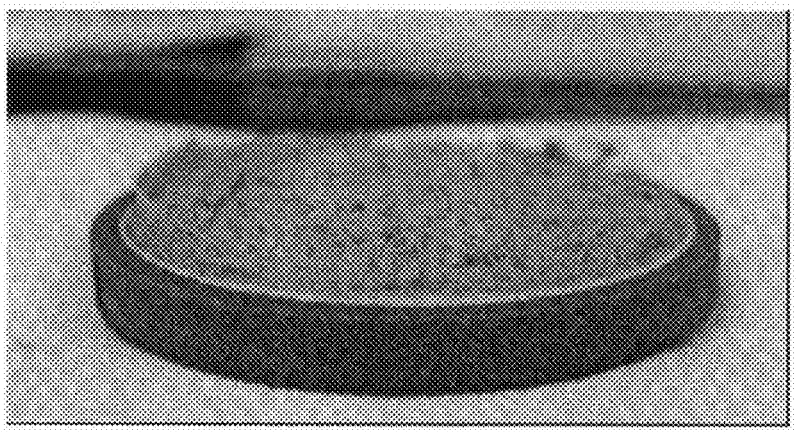
FIG. 2 is a photograph of the OBM filter cake of FIG. 1 after soaking.
Figure 3:
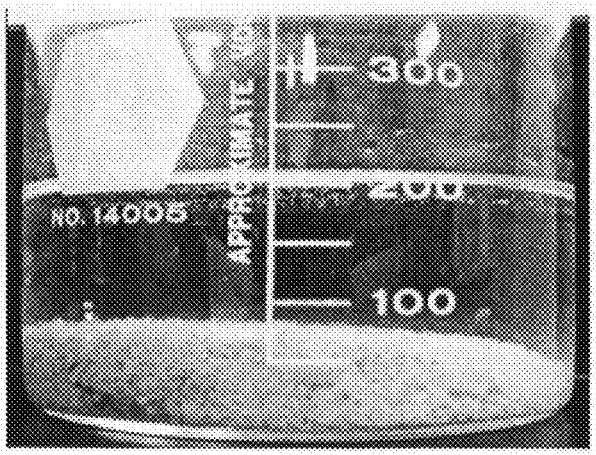
FIG. 3 is a photograph of part of the remaining filter cake particles after testing in fresh water to observe its potential for dispersion or water-wet condition.

After the disc was removed from the cell, the filter cake was observed and photographed (FIG. 2). Part of the remaining filter cake particles was tested in fresh water to observe its potential for dispersion or water-wet condition (seen in FIG. 3). It was observed that the filter cakes were dispersed completely in water. The disc with the remaining filter cake particles were placed in acid in order to observe the dissolution of calcium carbonate. The generation of $CO_2$ gas was further evidence that the particles in the filter cake were water-wet by the soak solution. Table I shows results of the injection permeability tests using 20% DFE 734 in 10 lb/gal (1.2 kg/liter) $CaCl_2$ brine and 15% DFE 734 in 9.3 lb/gal (1.1 kg/liter) NaCl brine.

TABLE I

Water Injection Permeability Test Results
DFE 734/in situ Single Phase Microemulsion
Sandpack Permeameter/three-hour mud-off
on ceramic disc/leak-off valve closed

| Test without acid | Initial Permeability | Final Permeability | % Injection Permeability |
|---|---|---|---|
| Test #1 - 20% DFE 734 in 10 lb/gal (1.2 kg/liter) $CaCl_2$ 20 hours soak at 140° F. (60° C.) and 360 psi (2.5 MPa) on 3 µm disc | | | |
| | 277.9 | 314.7 | 113.2 |
| Test #2 - 15% DFE 734 in 9.3 ppg NaCl 20 hours soak at 150° F. (66° C.) and 360 psi (2.5 MPa) on 20 µm ceramic disc | | | |
| | 280.7 mD | 253.8 mD | 90.4 |

Conclusions of "Two-Step" Soak Procedure (Soak without Acid Followed by Conventional Acidification Process)

Phase I results suggest (94 to >100% water injection permeability) that the single phase microemulsion alters the filter cake (FIG. 2) so that when an acid treatment is added, the calcium carbonate particles can be dissolved by the acid without creating an unwanted sludge between the original OBM emulsion filter cake and the $CaCl_2$ brine single phase microemulsion.

The results in Tests 1 and 2 indicate that after the application of soak solution, the damage is removed as evidence by the high % injection permeability. The baseline test using only brine as a soak resulted in 0% injection permeability.

In summary, a two-step treatment consisting of an in situ microemulsification followed by an acid package (such as that previously identified in one non-limiting embodiment) will prepare a reservoir for water injection.

Phase 2: Testing the "One-Step" Soak Concept in the Sand Pack Permeameter

The second phase of the testing consisted of soaking the OBM filter cakes with blends of DFE 734 and an acid in brine. Tests were conducted with KCl, NaCl, HCOOK and NaBr. Examples using the blend of DFE 734 and acetic acid in $CaCl_2$ brine are shown in Table II and III.

The final density of the brines used in the tests of Table II and Table III were 10 lb/gal (1.2 kg/liter).

The first part of the test is the measurement of initial permeability. After establishing the initial seawater injection permeability, a 3-hour mud-off was performed to deposit a filter cake for subsequent destruction by the soak. After removing the mud from the cell and verifying that a good filter cake was deposited on the disc, the soak solution was carefully added and allowed to destroy the cake. The overbalanced pressure on the cake was 360 psi (2.5 MPa). A few pore volumes of filtrate were collected. Then, the solution was allowed to soak overnight with the valve closed. The next morning, the valve was opened in order to collect all of the filtrate. Next, seawater was pumped through the cell, forcing the residual soak solution through the disc. When the flow volume became stabilized, the test was terminated and the final water injection permeability was calculated.

Table II show the results of injection permeability performed with 20% DFE 734 and 10% formic acid in 10 lb/gal (1.2 kg/liter) calcium chloride brine. Table III show the results of injection permeability using a blend of 10% Acidgen HA+2% CS GBS-1 to generate acetic acid in 20% DFE 734 in 10 lb/gal (1.2 kg/liter) calcium chloride brine. This is an example of acetic acid being generated in situ in accordance with one optional embodiment of the method herein.

TABLE II

Water Injection Permeability Test Results
DFE 734/in situ Single Phase Microemulsion
Sandpack Permeameter/three-hour mud-off
on ceramic disc/leak-off valve closed
Test #3 - 20% DFE 734 and 10% formic acid in 10 lb/gal $CaCl_2$
(1.2 kg/liter) 20 hours soak at 140° F. (60° C.) and 360
psi (2.5 MPa) on 3 µm disc

| Test with 10% formic acid | Initial Permeability | Final Permeability | % Injection Permeability |
|---|---|---|---|
| | 201.4 mD | 358.1 | 177.6 |

TABLE III

Water Injection Permeability Test Results
DFE 734/in situ Single Phase Microemulsion
Sandpack Permeameter/three-hour mud-off on 20 µm ceramic disc and
leak-off valve open
Test #4 - 20% DFE 734 with in 10 lb/gal (1.2 kg/liter) $CaCl_2$ formulated
with an in situ acid generator.
Soak at 194° F. (90° C.) and 360 psi (2.5 MPa) on 20 µm disc
Test with leak-off valve open

| Test with 10% Acidgen HA + 2% CS GBS-1 | Initial Permeability | Final Permeability | % Injection Permeability |
|---|---|---|---|
| | 684 mD | 661.5 mD | 96.7 |

Conclusions of "One-Step" Soak Procedure
Phase 2: Conclusions

Phase 2 demonstrated an important concept for the inventive methods herein. The "one-step" in situ single phase microemulsion soak solution composed of completion brine, 20% of the DFE 734 and 10% acid is compatible and works simultaneously to prepare a sand face for injection or production Filtration Tests Filtration tests were performed in a double-ended HPHT (high-pressure, high-temperature) filtration cell using an 11.0 lb/gal (1.3 kg/liter) OBM drill-in fluid. The procedure includes a 3-hour mud-off at 500 psi (3.4 MPa) and 150° F. (66° C.) to deposit a filter cake.

After removing the mud from the cell and verifying that a good filter cake was deposited on the disc, the soak solution was added. Then, the cell was closed again and 200 psi (1.4 MPa) pressure was applied on the filter cake. The leak-off valve was opened to collect the filtrate as a function of time.

The soak solutions of 20% (v/v) of EXP 298 in 10 lb/gal (1.2 kg/liter) brine or 20% (v/v) of DFE 734 in 10 lb/gal (1.2 kg/liter) was used for filtration tests. Results of the filtration tests using soak solutions formulated with the EXP 298 or DFE 734 and NaBr, $CaCl_2$ or HCOOK brine described in Table IV are presented in FIGS. 4, 5, 6 and 7. In FIG. 4, the last example uses 10% Acidgen HA acetic acid generator together with 2% CS GBS-1 catalyst to trigger the acid generation. Acidgen HA is available from Cleansorb LTD, and CS GBS-1 is also available from Cleansorb LTD.

The filtration rates were controlled using an additive for delay. Upon removal of the filter cakes and discs, it was observed that the filter cakes were completely water wet, as evidenced by the easy dispersion of the cake particles in water (photograph of FIG. 8). When the filter cake samples were dispersed in water, no sheen was observed, indicating that all of the oil was incorporated into the soak solution.

TABLE IV

Formulations Used in Filtration Tests

| Additives | DFE 734 in 10 lb/gal (1.2 kg/liter) $CaCl_2$ | EXP 298 in 10 lb/gal (1.2 kg/liter) NaBr | EXP 298 in 10 lb/gal (1.2 kg/liter) HCOOK | EXP 298 in 10 lb/gal (1.2 kg/liter) $CaCl_2$ |
|---|---|---|---|---|
| Sodium bromide, wt % | — | 21.8 | — | — |
| Potassium formate, wt % | — | — | 33.7 | — |
| Calcium chloride, wt % | 23.1 | — | — | 23.1 |
| Water, wt % | 56.9 | 61.5 | 49.6 | 60.3 |
| *EXP 298, wt % | — | 16.7 | 16.7 | 16.7 |
| *DFE 734, wt % | 16.7 | — | — | — |

*16.7% of DFE 734 and 16.7% of EXP 298 by weight are equivalent to 20% by volume Test Conditions:
Cake deposition in 20-microns disc: 10 lb/gal (1.2 kg/liter) SBM, 3 hour at 150° F. (60° C.) and 1000 psi (6.9 MPa).
Soak conditions: 200 psi (1.4 MPa), 150° F. (60° C.), leak-off valve open.
Other Considerations
Screen Applications The "in-situ fluid" technology of this invention can be applied to filter cake clean up for stand-alone and expandable screen applications where an operator desires improved production or water injection. The advantage to this inventive method is that completion brine can be placed across the reservoir after the screens are in place and without the concern of producing unwanted sludge. The fact that OBM filter cake alteration and acidizing takes place simultaneously adds to a user's flexibility while saving time and money.

One non-limiting generalized procedure for using the "in-situ fluid" cake clean up technology is as follows.
  Drill to total depth (TD)
  Short Trip
  Run in hole (RIH) to bottom and condition the mud rheologically
  Pump push pill and solids-free OBM in open hole (OH) and 300 ft (91 m) of casing
  Pick up (P/U) to 100 ft (30 m) above the shoe, circulate and size to solids across appropriate shale shakers
  Pull out of the hole (POOH)
  P/U EXPress or other screen assembly, fill with mud containing sized solids
  RIH
  Expand Screen if EXPress (expandable screen)
  Trip out of hole (TOH) w/ tools
  RIH w/modified CSAP (packer, ball valve, wash pipe), set packer
  Spot the "in-situ fluid" soak solution
  Displace above the packer to brine
  Check leak-off
  Repeat spot/soak, as necessary
  POOH
Gravel Pack Embodiment The in situ microemulsion or other in-situ fluid technology of this invention also has an application in gravel pack operations after a reservoir is drilled with an OBM. Most of the procedures would be the same as outlined above with expandable and stand-alone screens. Solids-free and solids-conditioned OBMs are left in the open hole and casing respectively until screens are placed on bottom and the packer is set. After the packer is set, the casing above the packer is displaced to brine and the casing is cleaned. When rigged up to pump casing, a series of push and cleaning pills are used to replace the open hole to brine and scour the filter cake. The gravel pack carrier brine can be formulated as a miniemulsion, microemulsion, nanoemulsion or single phase emulsion, formed in situ, and allowed to change the OBM of the filter cake after the gravel is in place. The concentration can be adjusted to speed up or slow down the reversal. If acidizing is desired, acid may be placed inside the screens and allowed to diffuse toward the formation to decompose acid soluble components.

One advantage of this procedure is that massive shale or other troublesome shale sections are protected with an OBM until just before the gravel is pumped. A second advantage is that the carrier fluid may form an in-situ fluid (e.g. microemulsion) for total contact with the filter cake. A third benefit is that the solids-free and conditioned muds temporarily left in the hole while the screens are run to bottom can be recycled into the OBM. Finally, using the "in-situ microemulsion" removing OBM/acidizing technology or using the in situ microemulsion separately allows the operator to base his OBM formulation on reservoir needs because the single phase microemulsion technology is applicable to all OBM filter cakes.

Typically, PACA additives dissolve calcium carbonate and barium sulfate minerals slowly. Laboratory studies indicate that 24 to 48 hours are required to dissolve at least 50% of a given quantity of barium sulfate as shown in Table V. Also, this Table shows that at least 24 hours are required to dissolve 100% of calcium carbonate. The PACA additives used to prepare the data in Tables V was DTPA.

Table VI shows injection permeability results after soaking a 10.0 lb/gal (1.2 kg/liter) oil-base filter cake with a soak solution containing PACA. The test below achieved 38% return injection permeability after only a 20-hour contact of the soak solution with the filter cake. The sample without PACA achieved 3% of injection permeability after the 20-hours test. This percentage of injection permeability is acceptable considering only a 20-hour exposure time. Higher injection permeability can be achieved by extending the soak time which will dissolve a greater amount of calcium carbonate and barite.

TABLE V

Solubilization of Barium Sulfate and Calcium Carbonate Using PACA

| Time hours | Barium Sulfate Solubilization, % | Calcium Carbonate Solubilization, % |
|---|---|---|
| 0 | 0 | 0 |
| 24 | 50 | 100 |
| 48 | 69 | 100 |

TABLE VI

In-situ Microemulsion Soak/Injection Permeability Test Results
DFE 734/PACA Single Phase Microemulsion Soak
Disc-Sandpack Permeameter
Test #12 - Two-Hour Mud Off on 20 μm Ceramic Disc
10.0 lb/gal Oil-base Mud with Barite and 50 lb/bbl Calcium Carbonate

| One-Step Soak | Init. Perm | Final Perm | % Inj. Perm |
|---|---|---|---|
| 15% DFE 734 and 27% PACA in NaCl brine.* | 352 mD | 133.8 mD | 38 |
| 15% DFE 734 in NaCl brine.* | 335 mD | 10.05 mD | 3.0 |

*Soak time 20 hours. The test which included the PACA resulted in an improvement in injection permeability over the base-line test.

In summary, a number of conclusions may be reached.
1. The single phase microemulsion forming solution comprised of 10%-25% DFE 734 in brine forms an in-situ single phase microemulsion that appears to completely destroy the OBM portion of a filter cake. The filter cake loses all integrity and appears to become essentially entirely dislodged from the ceramic filter medium.
2. Other in-situ single phase microemulsion chemistry options are available. DFE 734 results in a $CaCl_2$ brine single phase microemulsion, while other surfactant options support the use of seawater, NaCl, or other brine types.
3. If the OBM is barite free or contains only acid soluble bridging components, the filter cake may be destroyed chemically by the single phase microemulsion chemistry and acid to allow for excellent injection rates.
4. The in-situ single phase microemulsion chemistry may be blended in brine containing an acid package to clean up the filter cake in a 1-step clean up process.
5. Static filter cakes deposited for long periods of time will require (1) either a high rate displacement to remove the enlarged, compacted external filter cake volume or (2) a longer soak time and a modified in-situ single phase microemulsion.
6. The alteration of the OBM filter cake using the in-situ single phase microemulsion technology is applicable after screen deployment or after gravel packing.
7. An operator can drill with an OBM and then safely and efficiently displace to brine in preparation for either a stand-alone screen, an expandable screen or low viscosity—open hole gravel pack applications when using a single phase microemulsion.
8. The displacement to brine can occur either before or after the screens have been run, provided the OBM has been conditioned for solids size.
9. In one non-limiting embodiment, the decision to displace an OBM and to remove the filter cake may be reservoir-based and should be determined by such factors including, but not limited to, the nature of drilled solids, formation fluid compatibilities and operation considerations.
10. Forming the microemulsions (or other emulsions) in situ avoids using additional oil or solvent in the formulation, which in turn gives higher capacity for oil incorporation in the formed microemulsion and/or increased cleaning capability when the microemulsion contacts the OBM (or SBM) filter cake.

In the foregoing specification, the invention has been described with reference to specific embodiments thereof, and has been suggested as effective in providing effective methods and compositions for removing filter cake particles from a hydrocarbon wellbore. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of single phase microemulsion-forming components and other components for forming the in-situ fluids, such as surfactants, chelating agents, acids, solvents, non-polar liquids, etc. and proportions thereof falling within the claimed parameters, but not specifically identified or tried in a particular composition to improve the removal of filter cake particles herein, are anticipated to be within the scope of this invention. Additionally, the methods and compositions of this invention may find utility in other applications besides screen applications, gravel pack applications and the like.

What is claimed is:
1. A method of cleaning oil-based mud (OBM) filter cake particles from a hydrocarbon reservoir wellbore comprising:
drilling a wellbore in a hydrocarbon reservoir with an OBM;
forming a filter cake of OBM particles over at least part of the wellbore;
contacting the OBM and filter cake with at least one surfactant, at least one co-surfactant and a polar liquid in the absence of a propionate and the absence of a co-solvent and forming in situ an in-situ fluid selected from the group consisting of a miniemulsion, a nanoemulsion, and a single phase microemulsion (Winsor IV), and thereby incorporating at least a portion of the oil in the filter cake particles into the in-situ fluid,
where the co-surfactant is selected from the group consisting of alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof.
2. The method of claim 1 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.
3. The method of claim 2 where in the surfactants, the nonionic surfactants are selected from the group consisting of alkyl polyglycosides, sorbitan esters, amine ethoxylates, diamine ethoxylates, methyl glucoside esters, polyglycerol esters, alkyl ethoxylates, alcohols that have been polypropoxylated and polyethoxylated, alcohols that have been polypropoxylated, alcohols that have been polyethoxylated; the anionic surfactants are selected from the group consisting of alkali metal alkyl sulfates, alkyl or alkylaryl sulfonates, linear or branched alkyl ether sulfates and sulfonates, alcohol polypropoxylated and polyethoxylated sulfates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates; the cationic surfactants are selected from the group consisting of arginine methyl esters, alkanolamines, and alkylenediamides, and mixtures thereof, and surfactants containing a non-ionic spacer-arm central extension and an ionic or nonionic polar group.

4. The method of claim 1 where the in-situ fluid further comprises brine containing salts selected from the group consisting of inorganic salts, organic salts and combinations thereof.

5. The method of claim 1 where the in-situ fluid is a thermodynamically stable, macroscopically homogeneous mixture of at least three components, where the three components comprise: a polar phase from the polar liquid, a nonpolar phase from the OBM or filter cake and the at least one surfactant.

6. The method of claim 1 where the filter cake particles are selected from the group consisting of calcium carbonate, hematite, ilmenite, manganese tetroxide, manganous oxide, iron carbonate, magnesium oxide, barium sulfate, and mixtures thereof.

7. The method of claim 1 where the in-situ fluid further comprises an acid selected from the group consisting of mineral acids and organic acids.

8. The method of claim 7 further comprising generating the acid in situ.

9. A method of cleaning oil-based mud (OBM) filter cake particles from a hydrocarbon reservoir wellbore comprising:
drilling a wellbore in a hydrocarbon reservoir with an OBM;
forming a filter cake of OBM particles over at least part of the wellbore;
pumping into the wellbore a gravel pack carrier brine comprising:
sized gravel,
at least one surfactant,
at least one co-surfactant, and
a polar liquid in the absence of added oil or solvent and in the absence of a propionate and the absence of a co-solvent;
placing a gravel pack into the wellbore;
contacting the OBM and filter cake with the gravel pack carrier brine and forming in situ an in-situ fluid selected from the group consisting of a miniemulsion, a nanoemulsion, and a single phase microemulsion (Winsor IV), and thereby incorporating at least a portion of the oil from the OBM into the in-situ fluid by solubilization without circulating the well;
changing the wettability of the filter cake particles from oil-wet to water-wet;
allowing the in-situ fluid to contact the filter cake for a period of time as a soak solution; and
removing a majority of the filter cake particles,
where the co-surfactant is selected from the group consisting of alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof.

10. The method of claim 9 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

11. The method of claim 10 where in the surfactants, the nonionic surfactants are selected from the group consisting of alkyl polyglyco-sides, sorbitan esters, amine ethoxylates, diamine ethoxylates, methyl glucoside esters, polyglycerol esters , alkyl ethoxylates, alcohols that have been polypropoxylated and polyethoxylated, alcohols that have been polypropoxylated, alcohols that have been polyethoxylated; the anionic surfactants are selected from the group consisting of alkali metal alkyl sulfates, alkyl or alkylaryl sulfonates, linear or branched alkyl ether sulfates and sulfonates, alcohol polypropoxylated and polyethoxylated sulfates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates; the cationic surfactants are selected from the group consisting of arginine methyl esters, alkanolamines, and alkylenediamides, and mixtures thereof, and surfactants containing a non-ionic spacer-arm central extension and an ionic or nonionic polar group.

12. The method of claim 9 where the in-situ fluid further comprises brine containing salts selected from the group consisting of inorganic salts, organic salts and combinations thereof.

13. The method of claim 9 where the in-situ fluid is a thermodynamically stable, macroscopically homogeneous mixture.

14. The method of claim 9 where the filter cake particles are selected from the group consisting of calcium carbonate, hematite, ilmenite, manganese tetroxide, manganous oxide, iron carbonate, magnesium oxide, barium sulfate, and mixtures thereof.

15. The method of claim 9 where the in-situ fluid further comprises an acid selected from the group consisting of mineral acids and organic acids.

16. The method of claim 15 further comprising generating the acid in situ.

17. A method of cleaning oil-based mud (OBM) filter cake particles from a hydrocarbon reservoir comprising:
drilling a wellbore in a hydrocarbon reservoir with an OBM;
forming a filter cake of OBM particles over at least part of the wellbore;
contacting the OBM and filter cake with at least one surfactant, at least one co-surfactant and a brine in the absence of added oil or solvent and in the absence of a propionate and the absence of a co-solvent and forming in situ an in-situ fluid selected from the group consisting of a miniemulsion, a nanoemulsion, and a single phase microemulsion (Winsor IV), and thereby incorporating at least a portion of the oil in the filter cake particles into the in-situ fluid,
where the in-situ fluid is a thermodynamically stable, macroscopically homogeneous mixture of at least three components, where the three components comprise: brine, a nonpolar phase from the OBM or filter cake and the at least one surfactant, and where the filter cake particles are selected from the group consisting of calcium carbonate, hematite, ilmenite, manganese tetroxide, manganous oxide, iron carbonate, magnesium oxide, barium sulfate, and mixtures thereof, and where the co-surfactant is selected from the group consisting of alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof.

18. The method of claim 17 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

19. The method of claim 18 where in the surfactants, the nonionic surfactants are selected from the group consisting of alkyl polyglyco-sides, sorbitan esters, amine ethoxylates, diamine ethoxylates, methyl glucoside esters, polyglycerol esters, alkyl ethoxylates, alcohols that have been polypropoxylated and polyethoxylated, alcohols that have been polypropoxylated, alcohols that have been polyethoxylated; the anionic surfactants are selected from the group consisting of alkali metal alkyl sulfates, alkyl or alkylaryl sulfonates, linear or branched alkyl ether sulfates and sulfonates, alcohol polypropoxylated and polyethoxylated sulfates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates; the cationic surfactants are selected from the group consisting of arginine methyl esters, alkanolamines, and alkylenediamides, and mixtures thereof, and surfactants containing a non-ionic spacer-arm central extension and an ionic or nonionic polar group.

20. The method of claim 17 where the in-situ fluid further comprises an acid selected from the group consisting of mineral acids and organic acids.

* * * * *